April 6, 1937.  W. MARSHALL ET AL  2,076,243
COLLAPSIBLE TOP FOR AUTOMOBILES
Filed Sept. 8, 1932  2 Sheets-Sheet 1

INVENTORS.
William Marshall,
Donald A. Fryer.
BY
Dike, Calvert & Gray
ATTORNEYS.

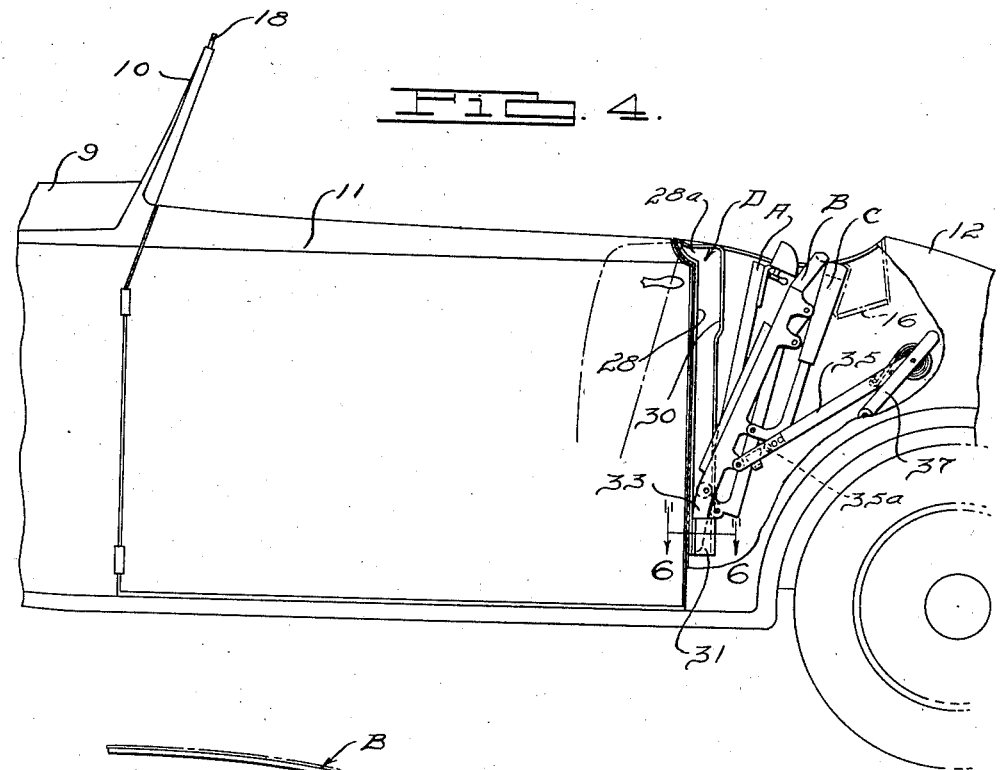

Patented Apr. 6, 1937

2,076,243

UNITED STATES PATENT OFFICE 2,076,243

COLLAPSIBLE TOP FOR AUTOMOBILES

William Marshall and Donald A. Fryer, Detroit, Mich., assignors to Briggs Manufacturing Company, Detroit, Mich., a corporation of Michigan Application September 8, 1932, Serial No. 632,206

15 Claims. (Cl. 296—107)

This invention relates to automobile bodies of the type having collapsible tops, an object of the invention being to provide an improved body construction whereby the top may be readily and easily collapsed or closed into a compact folded unit and positioned preferably interiorly of the body in a compartment or space in rear of the seat, thus enabling the top to be disposed substantially out of sight and improving the appearance of the car when the top is down.

A further object of the invention is to provide a collapsible top for an automobile body and improved controlling means therefor whereby the top, when closed into a folded unit, may be shifted bodily into a space or compartment in the body in such manner that the folded sections of the top will assume upright positions, thus occupying substantially less space in rear of the seat and having the advantage of enabling wider doors to be utilized without affecting the body proportions in rear thereof.

A further object of the invention is to provide an automobile body having a top which is capable of being collapsed into a compact unit and shifted vertically into a compartment or space in the rear part of the body, and wherein a spring propelled device is provided for exerting a lifting force on the unit effective to assist in raising the unit into position to permit it to be opened or unfolded, thus minimizing the manual effort required for manipulating the top.

Other objects of this invention will appear in the following description and appended claims, reference being had to the accompanying drawings forming a part of this specification wherein like reference characters designate corresponding parts in the several views.

Fig. 4 is a view similar to Fig. 1 but illustrating the collapsed top in substantially its final position when housed within the body.

Fig. 5 is a fragmentary section taken substantially through line 5—5 of Fig. 1 in the direction of the arrows.

Fig. 6 is a horizontal detail section taken through line 6—6 of Fig. 4 in the direction of the arrows.

Fig. 7 is a detail section taken substantially through line 7—7 of Fig. 1 in the direction of the arrows.

Fig. 8 is a detail illustrating the equalizing bar.

Figure 1:
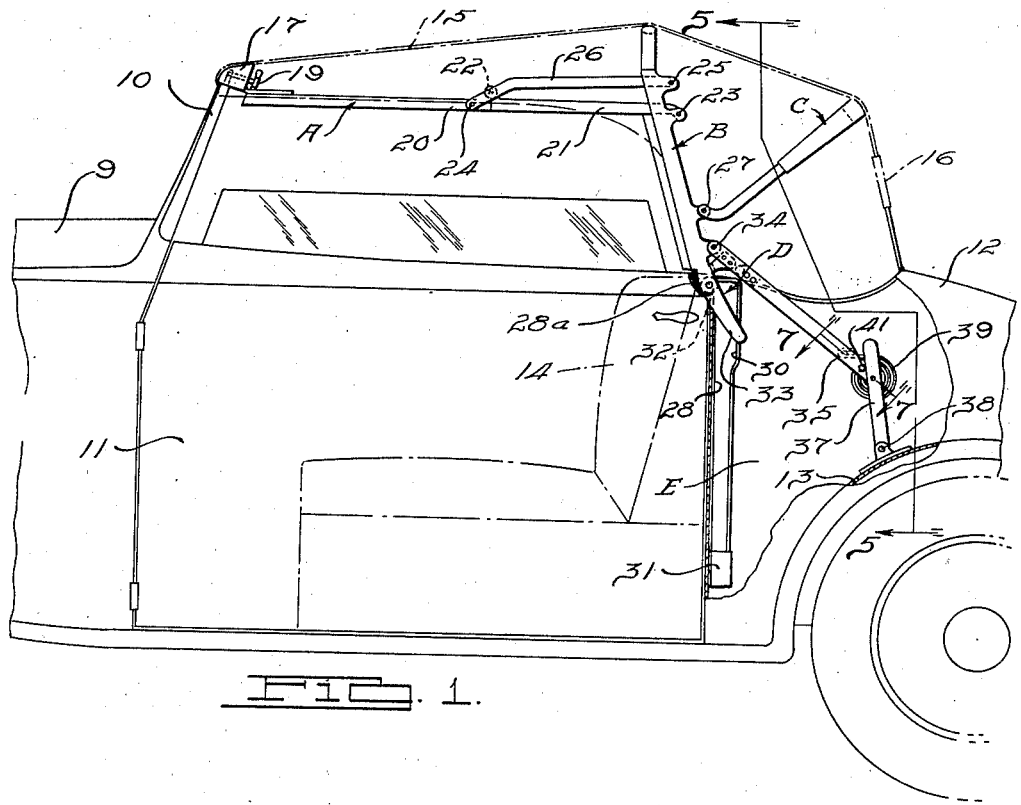
Fig. 1 is a side elevation, partly broken away, illustrating one type of automobile body having a collapsible top structure embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present invention may be utilized in connection with various types of automobile bodies, one type being illustrated in the present case by way of example. This body includes a cowl 9, windshield frame 10, side doors 11, and rear enclosing panels forming, in the present instance, a rear deck 12 and a wheel housing 13. A seat unit 14 is arranged within the passenger compartment.

The collapsible top in the present instance comprises a suitable flexible top or cover material 15 supported in open position by means of a plurality of articulated members. The top fabric embodies the usual rear window glass 16. Regarding the top structure in its open position, it will be seen that the supporting frame members thereof comprise a forwardly extending substantially horizontal bow A which at its forward end is supported on the windshield frame 10; a main upright bow B which is supported on the frame of the body in rear of the seat unit 14; and a rear bow C. The bow A at its forward end includes a transverse header member 17 having sockets to receive the posts 18 on the upper windshield header, these parts being firmly clamped together by means of wing screws 19. The forwardly extending parallel sides of the bow A each comprise a pair of normally alined bars 20 and 21 hinged together at 22, the rear bar 21 being hinged to the bow B at 23. Pivoted at each side to the forward bar 20 at 24 and to a side of the bow B at 25 is a link 26. The side arms of the bow C are pivoted at their lower ends to the opposite parallel sides of the bow B at 27. The foregoing parts of the collapsible top may be of conventional construction.

Mounted in rear of the seat 14 and carried by the door posts are a pair of vertically extending guides D constructed for the purpose of guiding and controlling the folded top unit when shifted into position within a space or compartment E in rear of the seat 14. As shown in Fig. 6 each guide D is preferably in the form of sheet metal stamping of general channel shape having flanges 28 and 30 and an intermediate web 29. At the lower end of the guide the channel is closed by means of a Z-shaped stamping 31 welded to the flanges of the guide and forming a closed pocket.

Each of the side portions of the main bow B carries in its length an anti-friction device or roller 32 and below this roller the side of the bow B has an extended portion or leg 33 which projects below the top of the guide D when the top is open, as shown in Fig. 1.

Pivoted at 34 to each of the sides of the bow B at a point above the roller 32 is one end of a lifting and controlling arm 35, the opposite end of this arm being pivoted on a stud 36, see Fig. 7, carried by an oscillatable arm 37, the latter being pivoted at 38 to a bracket secured to the wheel housing 13. A counterbalancing and lifting spring is carried by each of the arms 37, the construction in the present instance comprising a clock type spring 39 attached at one end to the stud or pivot 36 and at its outer end attached to a pin 40 on the arm 35. It will be seen that each arm 35 functions as a lever having its fulcrum at the pivot 36 and the lifting power or counteracting effort applied between its ends at the point of connection 40 of the spring 39. Hence, when the lever 35 is swung downwardly the spring will be wound and placed under tension. The spring, in all positions of the arm 35, exerts an upward pull on the arm tending either to raise or lift the collapsible top or maintain it in its open position.

Figure 2:
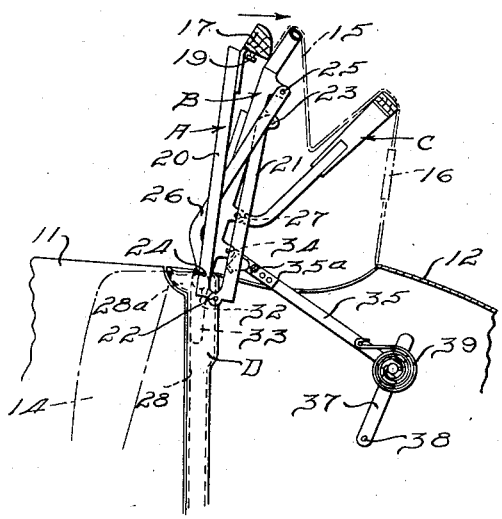
Figs. 2 and 3 are fragmentary detail views illustrating successive positions during the operation of collapsing the top and positioning the folded unit.

It will be seen that when the top is in its open position, as illustrated in Fig. 1, the rollers 32 will be lodged within a lateral notch or recess 28a at the upper end of the guide D, formed by a forwardly offset portion of the flanges 28 and 29 to provide a longitudinally offset seat, whereby the bow B will be supported against downward movement. In order to collapse the top the header 17 is released from the posts 18 on the windshield frame and the parts folded and moved into the successive positions shown in Figs. 2 and 3. This movement results in shifting the rollers 32 rearwardly or longitudinally of the body out of the notches 28a into engagement with the guide flanges 30, and in moving the legs 33 forwardly into engagement with the vertical guide flanges 28 of the guides D. During this rearward oscillating movement of the main bow B, the arms 37 will swing rearwardly substantially to the positions shown in Figs. 2 and 3. It will be noted that when the folded top unit reaches approximately the position of Fig. 3 it is held against rearward swinging movement since the rollers 32 and legs 33 in cooperation with the guides D provide stops to maintain the folded sections of the top unit in upright positions. The folded unit may then be shifted vertically from the position shown in Fig. 3 to the position shown in Fig. 4. During this action the levers 35 will be swung downwardly resulting in winding up the springs 39 and storing up energy therein. The downward limit of movement of the parts is determined by the stops 41 on arms 35 and by the pockets 31 which receive the legs 33. The connection 34 of the lever 35 travels in a vertical path, in conformance with the vertical movement of the top unit, by virtue of the rearward oscillation of arm 37. The springs exert a counterbalancing effort against the weight of the folded top, and the movement of the upright folded sections into the position shown in Fig. 4 is controlled by means of the rollers 32 and legs 33 travelling against the opposed faces of the guide flanges 28 and 30.

It will be seen that but a relatively narrow space or compartment E is required for housing the folded top since the folded sections thereof are disposed within the compartment in upright positions, thus occupying substantially less space in the length of the body than heretofore where the folded sections are supported in horizontal position in rear of the body seat.

Figure 3:
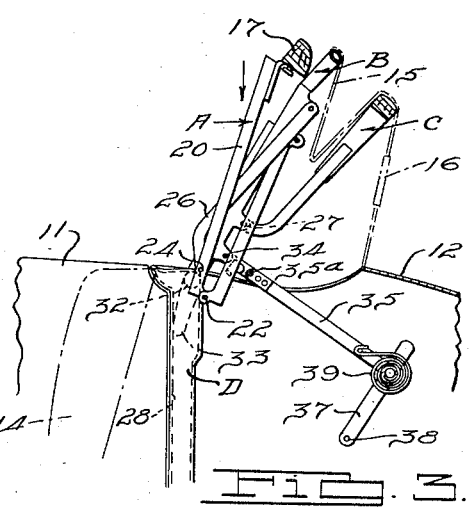

The folded unit may be lifted out of the space or compartment E without substantial effort, it being merely necessary to exert an initial pull to start the unit whereupon the lifting spring 39 will exert sufficient lifting power on the arms 35 substantially to lift the unit from the position shown in Fig. 4 to the position shown in Fig. 3. Moreover, the arms 35 at opposite sides of the compartment E are rigidly connected together in such manner that the top may be shifted into its compartment or elevated from the compartment by one person from either side of the vehicle.

This connecting means may comprise a tubular cross bar 35a having its opposite ends flattened and bent at right angles to provide legs 35b which are riveted at points 35c to the arms 35. The bar 35a forms an equalizer which causes both lateral sides of the top unit to move equally when the unit is shifted into and out of the compartment.

One of the important advantages resulting from the present invention resides in the fact that in body types having two doors, such as roadsters, cabriolets or convertible coupes, it is now possible to provide substantially wider doors than heretofore since the opening between the seat unit and rear deck 12 occupies substantially less space longitudinally of the body than the space heretofore required for the folded top when positioned outside the body with the folded sections in horizontal position. In other words, the space in a longitudinal direction occupied by the folded top is substantially less when the top sections are housed in upright positions than when laid back flat upon the body. Heretofore, it has been found necessary, in order that the folded top would not extend over the rear deck, to provide narrower doors, or if not this, to shorten the rear deck.

We claim:

1. In an automobile body having a rear compartment within the body and transversely spaced upright pillars at the forward side of the compartment forming the margins of door openings, vertical guide channels carried by the pillars, a foldable top including a main upright bow having side members provided with stop devices adjacent but spaced from the lower ends thereof, said side members being rearwardly tiltable at an angle to said channels and out of alinement therewith whereby said devices and ends slidably engage opposite sides of the channels to maintain the top in upright position when guided vertically into the compartment, and seats located out of the path and forwardly of the upper ends of said channels and forming mountings for said devices when the top is raised.

2. A collapsible top for a vehicle body having a rear compartment within the body, comprising a main upright top supporting bow, upright guide means within said compartment for guiding said bow in upright position into the compartment, said bow and compartment having co-operating means for supporting the bow out of cooperative relation to said guide means, and said bow being rearwardly oscillatable when folding the top to shift its said means bodily in a longitudinal direction into operative relation to said guide means while said bow is in substantially fully raised position, and means for preventing the bow from falling backwards.

3. A collapsible top for a vehicle body having a seat and a compartment within the body in rear of the seat, comprising a transverse main upright top supporting bow having anti-friction devices adjacent its ends, upright guide means within the compartment with which said devices cooperate for guiding the bow in upright position into the compartment, a rear top supporting bow connected to said main bow, supports on said body ahead of the guide means and adapted to be engaged by said devices for supporting the main bow in upright extended position while maintaining said devices out of cooperative relation to said guide means, and means for guiding said main bow longitudinally of the vehicle while in substantially fully raised upright position above the compartment to shift said devices bodily into and out of cooperative relation to said supports and guide means.

4. A collapsible top for a vehicle body having a compartment within the body, comprising a main upright top supporting bow, a rearwardly extending top supporting bow pivotally connected to said main bow, said main bow being rearwardly oscillatable about pivots connecting it to the body and having said pivots shiftable bodily in a longitudinal direction when the top is folded whereby said folded top will overlie the compartment while in substantially fully raised upright position, and means for guiding the folded top unit vertically into the compartment.

5. In an automobile body having a rear compartment within the body, a collapsible top including a main upright top supporting bow, a rearwardly extending top supporting bow pivotally connected to said main bow, means for supporting said main bow when the top is extended, means for guiding said main bow vertically and in upright position into the compartment, and means for guiding the ends of said main bow longitudinally of the body into and out of cooperative relation to each of said means when the top is in raised upright position.

6. In an automobile body having a rear compartment within the body, a collapsible top including a main top supporting bow, a rear bow connected thereto, means for guiding the top vertically into the compartment when collapsed, the ends of said main bow having supporting connections with the body for maintaining the same in top supporting position, and means for guiding said connections longitudinally out of supporting position when the top is collapsed and said main bow is in raised upright position to the position where the top may be shifted vertically into the compartment.

7. In an automobile body having a rear compartment within the body, a collapsible top including a main upright bow, a rear bow connected thereto, supports on the body for the ends of said main bow, means for guiding said main bow bodily and rearwardly from the supports when the top is collapsed and said main bow is in raised upright position, and means for guiding the collapsed unit vertically into the compartment.

8. In an automobile body having a rear compartment within the body, a collapsible top including a main upright bow, supports on the body for the ends of said bow, means for guiding said bow ends bodily rearwardly from the supports when the top is collapsed and said main bow is in raised upright position, guides within the compartment for guiding the collapsed unit in upright position into the compartment, said supports being offset forwardly of the upper ends of the guides.

9. An automobile body having a collapsible top comprising articulated members adapted to be folded together as a unit and including an upright bow, upright guide means carried by the body for slidingly supporting said bow whereby said top is shiftable bodily as a unit into upright position within a space in the body, said guide means having longitudinally offset seats at the upper ends thereof cooperating with the ends of said bow for supporting the same in upright position when the top is extended, a pair of parallel connected swinging arms connected to the ends of said bow, oscillatable means for supporting said arms, and a lifting spring acting on each arm for exerting a force tending to lift the folded top from said space.

10. In an automobile body, a foldable top including a main upright bow having transversely spaced side members, means for guiding said top in folded condition into a space within the body while maintaining said bow in upright position, said guide means having longitudinally offset seats at the upper ends thereof cooperating with the ends of said bow for supporting the same in upright position when the top is extended, a pair of transversely spaced spring actuated arms pivotally connected to said side members for controlling the movement of the folded top, longitudinally oscillatable members pivotally connected to said arms for supporting the same, and a transverse equalizing bar rigidly connecting said arms.

11. A collapsible top for an automobile body having a seat and a compartment in rear thereof within the body, comprising a rigid upright top supporting bow, means cooperating with the ends of said bow for guiding the top vertically into the compartment with said bow maintained in upright position, said guide means having longitudinally offset seats at the upper ends thereof cooperating with the ends of said bow for supporting the same in upright position when the top is extended.

12. A collapsible top for an automobile body having a door and a compartment within the body in rear of said door, comprising a rigid upright top supporting bow, vertical guides carried by the door pillars at the front of the compartment, said bow having the ends thereof adapted to cooperate with the guides for sliding the folded top into the compartment while said bow is maintained in upright position, and means on said pillars for supporting the ends of said bow in advance of the guides and out of the path thereof when the top is extended.

13. A collapsible top for an automobile body having a door and a compartment within the body in rear of said door, comprising a rigid upright top supporting bow, vertical guides carried by the door pillars at the front of the compartment, said bow having the ends thereof adapted to cooperate with the guides for sliding the folded top into the compartment while said bow is maintained in upright position, and seats forwardly offset from the upper ends of said guides for supporting the ends of the bow when the top is extended, said bow being bodily movable into and out of cooperative relation to said guides and said seats being transversely spaced apart substantially the same distance as said vertical guides.

14. In an automobile body and top therefor, a movable main bow, means for restricting a point near the lower end of each leg of the bow to a path on the body having an upright main portion and an approximately horizontal upper portion extending longitudinally of the body, the points on the bow being in the horizontal portion of the paths when the top is up, and means to prevent movement of the ends of the bow along the upper portions of said paths when the top is held in its raised position.

15. In an automobile body and top therefor, a movable rigid main bow, means for restricting a point near the lower end of each leg of the bow to a path on the body having an upright main portion and a short approximately horizontal upper portion extending longitudinally of the body, the paths being parallel and the points on the bow being in the horizontal portions of the paths when the top is in raised position, and means to prevent movement of the ends of the bow along the upper portions of the paths when the top is in its raised position.

WILLIAM MARSHALL.
DONALD A. FRYER.